(12) United States Patent
Krischer et al.

(10) Patent No.: US 7,548,532 B2
(45) Date of Patent: *Jun. 16, 2009

(54) METHOD AND APPARATUS TO PROVIDE INLINE ENCRYPTION AND DECRYPTION FOR A WIRELESS STATION VIA DATA STREAMING OVER A FAST NETWORK

(75) Inventors: Mark Krischer, Lane Cove (AU);
Philip J. Ryan, Stanmore (AU);
Michael J. Webb, Denistone West (AU)

(73) Assignee: Cisco Technology, Inc., San Jose, CA (US)

( * ) Notice: Subject to any disclaimer, the term of this patent is extended or adjusted under 35 U.S.C. 154(b) by 711 days.

This patent is subject to a terminal disclaimer.

(21) Appl. No.: 11/198,664

(22) Filed: Aug. 5, 2005

(65) Prior Publication Data

US 2006/0014522 A1 Jan. 19, 2006

Related U.S. Application Data

(63) Continuation of application No. 10/815,283, filed on Mar. 31, 2004, now Pat. No. 6,970,446, which is a continuation-in-part of application No. 10/724,559, filed on Nov. 26, 2003, now Pat. No. 6,954,450.

(51) Int. Cl.
*H04Q 7/24* (2006.01)
*H04L 12/28* (2006.01)
*H04N 7/167* (2006.01)

(52) U.S. Cl. ............... 370/338; 370/392; 380/200

(58) Field of Classification Search ............ 370/338, 370/392; 380/200
See application file for complete search history.

(56) References Cited

U.S. PATENT DOCUMENTS

| 5,440,545 A | 8/1995 | Bucholtz et al. | 370/426 |
| 5,491,802 A | 2/1996 | Thompson et al. | 395/200.18 |
| 5,513,263 A | 4/1996 | White et al. | 380/44 |
| 5,751,708 A | 5/1998 | Eng et al. | 370/389 |
| 5,872,777 A | 2/1999 | Brailean et al. | 370/349 |

(Continued)

OTHER PUBLICATIONS

An office action for U.S. Appl. No. 11/218,125 mailed Jun. 24, 2008.

(Continued)

*Primary Examiner*—Andrew Lee
(74) *Attorney, Agent, or Firm*—Dov Rosenfeld; Inventek (57) ABSTRACT

A method of wirelessly transmitting or receiving a packet of information, and an apparatus to wirelessly transmit or receive a packet of information. In the case of transmitting, the method includes streaming a data element, including at least some of the contents of the packet, over a network link during transmit time, including encrypting the data element during the streaming in real time prior to the transfer over the network link. In the case of receiving, the method includes streaming a data element, including at least some of the contents of the received packet, over a network link during receive time, including decrypting the data element during the streaming in real time after to the transfer over the network link. The transmitting or receiving is by a station of a wireless network and the streaming is to or from the station from or to a network device coupled to the station by the network link.

20 Claims, 4 Drawing Sheets

U.S. PATENT DOCUMENTS

| | | | |
|---|---|---|---|
| 5,907,546 A | 5/1999 | Henriksson et al. | 370/349 |
| 6,253,271 B1 | 6/2001 | Ram et al. | 710/128 |
| 6,263,374 B1 | 7/2001 | Olnowich et al. | 709/253 |
| 6,298,071 B1 | 10/2001 | Taylor et al. | 370/486 X |
| 6,404,772 B1 | 6/2002 | Beach et al. | 370/443 |
| 6,487,178 B1 | 11/2002 | Romesburg et al. | 370/286 |
| RE37,980 E | 2/2003 | Elkhoury et al. | 710/310 |
| 6,526,506 B1 | 2/2003 | Lewis | 713/153 |
| 6,539,031 B1 | 3/2003 | Ngoc et al. | 370/470 |
| 6,694,134 B1 | 2/2004 | Lu et al. | 455/419 |
| 6,751,728 B1 | 6/2004 | Gunter et al. | 713/153 |
| 6,842,446 B2 | 1/2005 | Everson et al. | 370/349 |
| 6,918,034 B1* | 7/2005 | Sengodan et al. | 713/160 |
| 7,107,045 B1* | 9/2006 | Knoop | 455/414.1 |
| 7,216,230 B2* | 5/2007 | Suzuki et al. | 713/170 |
| 7,227,871 B2* | 6/2007 | Dworkin et al. | 370/442 |
| 7,337,384 B2* | 2/2008 | Lakaniemi | 714/776 |
| 7,382,881 B2* | 6/2008 | Uusitalo et al. | 380/262 |
| 2003/0009624 A1 | 1/2003 | Gruner et al. | 711/119 |
| 2003/0041163 A1 | 2/2003 | Rhoades et al. | 709/232 |
| 2003/0065832 A1 | 4/2003 | Emerson et al. | 710/23 |
| 2003/0206535 A1 | 11/2003 | Shpak | 370/328 |
| 2004/0114559 A1 | 6/2004 | Wang | 370/338 |
| 2004/0143442 A1 | 7/2004 | Knight | 704/270.1 |
| 2005/0010815 A1 | 1/2005 | Kotzin | 713/201 |
| 2005/0094584 A1* | 5/2005 | Kluge et al. | 370/310 |
| 2007/0002821 A1 | 1/2007 | Carlson et al. | 370/349 |

OTHER PUBLICATIONS

Office Action of Chinese Application 200480033677.X issued on Jun. 6, 2008 and English translation thereof.

J. Stokes. "Understanding Bandwidth and Latency." Downloaded May 22, 2003 from Ars Technica. URL: http://www.arstechnica.com/paedia/b/bandwidth-latency/bandwidth-latency-1.html.

"SOC-it." 2002. MIPS Technologies, Mountain View, CA. URL: http://www.mips.com/ProductCatalog/P_SOC-it/SOC-it.pdf.

A. Mendelsohn. "FPGA-Based I/O Board Offloads Windows PC's." Product of the Week on Chipcenter.com, May 22, 2003.

* cited by examiner

| Length | 400 |
|---|---|
| 7 | Preamble |
| 1 | SFD (10101011) |
| 6 | Dest. Addr. |
| 6 | Src. Addr. |
| 2 | TYPE 1 — 403 |
| 3 | List length — 405 |
| 1 | ID_pointer — 407 |
| 3 | Length_pointer — 409 |
| 4 | Buffer pointer — 411 |
| 1 | ID_length — 413 |
| 3 | Length_length — 415 |
| 3 | Buffer length — 417 |
| 1 | ID_KID — 419 |
| 3 | Length_KID — 421 } 441 |
| 3 | KID — 423 |
| 1 | ID_CrypLen — 425 |
| 3 | Length_CrypLen — 427 } 443 |
| 3 | CrypLen — 429 |
| 1 | ID_integr — 431 |
| 3 | Length_integr — 433 } 445 |
| 3 | Integrity — 435 |

FIG. 4A

| Length | 450 |
|---|---|
| 7 | Preamble |
| 1 | SFD (10101011) |
| 6 | Dest. Addr. |
| 6 | Src. Addr. |
| 2 | TYPE 2 — 453 |
| 3 | List length — 455 |
| 1 | ID_pointer |
| 3 | Length_pointer } 457 |
| 4 | Buffer pointer |
| 1 | ID_length |
| 3 | Length_length } 459 |
| 3 | Buffer length |
| 1 | ID_KID |
| 3 | Length_KID } 461 |
| 3 | KID |
| 1 | ID_CrypLen |
| 3 | Length_CrypLen } 463 |
| 3 | CrypLen |
| 1 | ID_integr |
| 3 | Length_integr } 465 |
| 3 | Integrity |
| 1 | ID_data — 471 |
| 3 | Length_data — 473 |
| variable | Data — 475 |

FIG. 4B

METHOD AND APPARATUS TO PROVIDE INLINE ENCRYPTION AND DECRYPTION FOR A WIRELESS STATION VIA DATA STREAMING OVER A FAST NETWORK

RELATED PATENT APPLICATIONS

The present invention is a continuation of U.S. patent application Ser. No. 10/815,283 to inventors Krischer, et al., filed: Mar. 31, 2004 now U.S. Pat. No. 6,970,446 and titled METHOD AND APPARATUS TO PROVIDE INLINE ENCRYPTION AND DECRYPTION FOR A WIRELESS STATION VIA DATA STREAMING OVER A FAST NETWORK, the contents of which are incorporated herein be reference.

U.S. patent application Ser. No. 10/815,283 is a continuation-in-part of U.S. patent application Ser. No. 10/724,559 to inventors Krischer, et al., filed Nov. 26, 2003, now U.S. Pat No. 6,954,450 titled A METHOD AND APPARATUS TO PROVIDE DATA STREAMING OVER A NETWORK CONNECTION IN A WIRELESS MAC PROCESSOR, assigned to the assignee of the present invention. U.S. patent application Ser. No. 10/724,559 is referred to herein as the Parent Application, and incorporated herein by reference.

BACKGROUND

This invention is related to wireless networks, and in particular to a MAC controller and method for MAC cryptography that carries out the actual cryptographic functions outside of the wireless station containing the MAC processor, for example, in an entity coupled to the wireless station by a packet network link.

Figure 1:
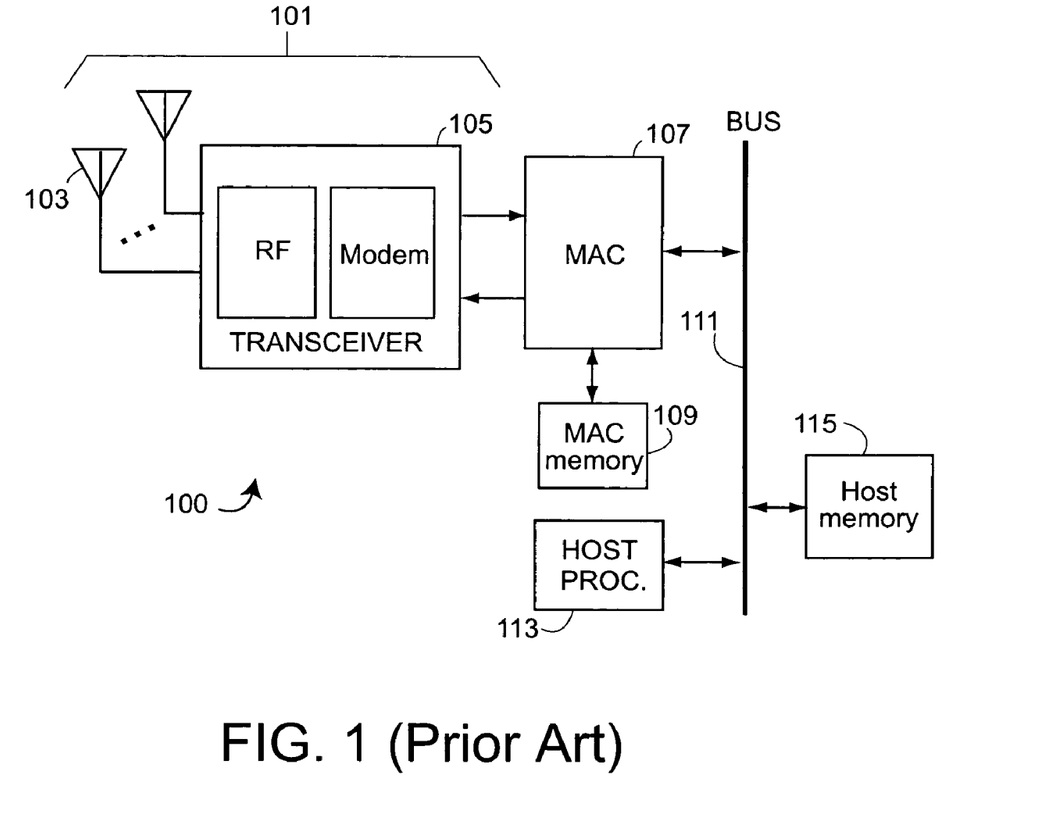
FIG. 1 shows a prior-art wireless network connection for a wireless local area network (WLAN).

FIG. 1 shows a traditional prior-art wireless network connection 100, e.g., for a wireless local area network (WLAN) that conforms to one of the IEEE 802.11 standards. The radio part 101 includes one or more antennas 103 that are coupled to a radio transceiver 105 including an analog RF part and a digital modem. The digital modem of radio 101 is coupled to a MAC processor 107 that implements the MAC protocol. The MAC processor 107 is connected via one or more busses, shown symbolically as a single bus subsystem 111, to a host processor. The host processor includes a memory, e.g., RAM connected to the host bus, shown here as part of the bus subsystem 111.

In implementing the MAC protocol, e.g., the IEEE 802.11 MAC protocol, the MAC processor 107 decides which MAC packets to transmit at what time. A typical prior art MAC processor 107 includes a fast but relatively small local memory, shown as MAC memory 109 in FIG. 1, that makes sure the MAC processor has fast access to the packets it needs to transmit. The host processor decides which MAC packets the MAC processor is likely to need, and sends such packets to be included in the local MAC memory 109. When there are one or more packets to transmit, the MAC processor then takes such packets from its MAC memory 109.

There recently has been a desire to move more and more of the MAC processing functions to the host processor. The host, for example, may implement a WLAN access point. By moving more and more of the functionality to software on the host, more flexibility is achieved.

In one such arrangement, the MAC processing functions are divided between a "Lower MAC" that implements in hardware such aspects as interfacing to the physical radio (the PHY) 101, encryption, and the actual receiving and sending of MAC packets. The Lower MAC may be implemented using a processor and includes a local memory. The "Higher MAC" functions, i.e., the remaining MAC functions, are implemented in software running on a host processor. The Lower MAC is coupled to the host processor via a bus subsystem.

When to-be-transmitted packets are ready, the host passes information to the Lower MAC on such packets. The information, for example, may include information on where the payload for the MAC packets resides in the host memory. This information is stored locally on the Lower MAC. When the Lower MAC is set up to transmit the to-be-transmitted MAC packets, the Lower MAC sets up DMA transfer of the required data. The data is then passed to the Lower MAC processor via DMA from the host.

This avoids the miss situation of the prior-art method that includes the host predicting and pre-loading the local MAC memory with to-be-transmitted packets.

There has recently been a desire to move more of the intelligence of a station used as an access point (AP) to the switch. For example, it may be that some of the MAC functionality will be carried out in a switch to which the access point is connected.

In the Parent Patent Application is described a method and an apparatus that provides for data streaming of a to-be-transmitted packet from a switch to which the AP is directly connected, e.g., via a fast (e.g., Gigabit) Ethernet. The Parent Patent Application introduces a special Ethernet controller that, in addition to the standard Ethernet MAC and PHY function, acts as a network DMA controller. The Parent Patent Application further introduces a special packet of a first new type that contains a pointer and length that is created by the special Ethernet controller, and that is sent to the switch or other device connected to the AP. The Parent Patent Application further introduces a special packet of a second new type for sending the data requested by the first-type special packet. The switch or other device connected to the AP has a matching special Ethernet controller that understands and creates such special packets. Thus, when the switch receives a packet of the first special type, it responds with the requisite data. The data for the packet is streamed directly from the switch to the MAC in transmit time.

The Lower MAC processor of a prior art AP typically includes a cryptography engine to encrypt packets for transmission, on the fly, or to decrypt received packets, again on the fly. One reason encryption is done on the fly, at the last minute, is for example, if there is a need to re-encrypt packets for transmission, the packets are to be locally available and the encryption performed at the last moment.

One disadvantage of encrypting the data using an encryption engine in the MAC processor is that unencrypted data is then present locally at the wireless station, adding to vulnerability. Furthermore the local wireless station needs to locally store and maintain the required encryption keys, again adding to vulnerability.

Thus there is a need in the art for a method and apparatus that allows encryption to be carried out on a device remote from the AP, e.g., the edge switch.

As described in the Parent Application, it may be that some of the MAC functionality will be carried out in a switch to which the access point is connected. With the system described in the Parent Application, one may carry out the encryption in the switch prior to streaming the data for transmission. That is, one could effectively encrypt prior to enqueue on the AP. However, this is undesired. This decouples the encryption process on the switch from the process of selecting the next packet in the AP. In order to do this, the switch must make assumption about what will happen and when. When those assumptions are incorrect, the AP must at best request a newly encrypted version of the packet, or at worst, simply discard the packet and wait for the higher layers to sort out the situation. That is, the inventors believe that encrypting at the switch prior to the enqueue is too early. For example, depending on what happens with the packet, there may be a need to request that the to-be-transmitted packet be re-encrypted. If such encryption is carried out at the switch, this would require sending packets back to the switch from the MAC. This not only implies a need for the switch to maintain the unencrypted packets until they are transmitted, but also adds significant latency to the transmission time. Furthermore, such an arrangement may considerably complicate the architecture.

There is thus a need in the art for a mechanism that provides for more of the MAC functionality to reside in a device remote from the wireless station itself, including encryption, without the negative side effects that may require re-encryption of data. There therefore is a need for a method and apparatus that carries out the encryption process inline with the wireless transmission, e.g., by maintaining the coupling between the AP's transmitting information and the encryption.

SUMMARY

Disclosed herein are a method of wirelessly transmitting or receiving a packet of information at a wireless station, and an apparatus to wirelessly transmit or receive a packet of information. In the case of transmitting, the method includes streaming a data element, including at least some of the contents of the packet, over a network link to the station during transmit time. In the case of receiving, the method includes streaming a data element, including at least some of the contents of the received packet, over a network link during receive time. The transmitting or receiving is done by a station of a wireless network and the streaming is to or from the station from or to a network device coupled to the station by the network link.

In the case of transmitting, one aspect of the invention includes encrypting the data on-the-fly as it is being streamed across the network link during transmit time, which maintains the coupling between the station's wirelessly transmitting information and the encryption. Another aspect of the invention is that the sending of the to-be-transmitted data over the network link need not occur until the last possible moment, such that no assumptions or predictions need to be made by the device connected to the station by the network link.

One embodiment is a method implemented in a station of a wireless network—in one embodiment, an IEEE 802.11 wireless network. The station is coupled to a network device, in one embodiment, a switch, by a network link, in one embodiment, a Gigabit Ethernet or any Ethernet at least as fast as a Gigabit Ethernet. The network device includes a memory. The method is of streaming data over the network link from or to the network device memory during wirelessly transmitting or wirelessly receiving at the station.

The method includes accepting information describing wherefrom to retrieve a data element including at least some of the data for a to-be-wirelessly-transmitted packet in the case of transmitting, or whereto write a data element including at least some of the data from a wirelessly received packet in the case of receiving. The information includes how to encrypt the data element in the case of transmitting and how to decrypt the data element in the case of receiving. The accepted information includes information defining a memory location and an amount data in the network device memory for the data element, and defining cryptographic information.

The method further includes setting up a DMA transfer of the data element for the to-be-wirelessly-transmitted packet in the case of transmitting, including setting up encrypting, or from the wirelessly received packet, including setting up decrypting, in the case of receiving, the setting up using the defining information.

In the case of transmitting, the method also includes converting the defining information to a packet of a first type for transport over the network link, and sending the packet of the first type via the network link to the network device to be interpreted at the network device to set up sending the data element from or writing the data element to the memory of the network device according to the defining information, and including encrypting in the case of transmitting, or decrypting in the case of receiving.

Also in the case of transmitting, the method includes receiving, in response to the sending of the packet, a packet of a second type that includes the data element encrypted according to the cryptographic information, converting the packet of the second type to the data element, and incorporating the data element into the packet for transmission, such that the transfer over the network, including the encrypting, occurs in real time during transmit time.

In the case of receiving, the method includes extracting the data element from the wirelessly received packet, encapsulating the data element into a packet of the second type to be written into the memory of the network device, and sending the packet of a second type to the network device to be interpreted at the network device to cause the encapsulated data to be written into the memory of the network device according to the defining information, such defining information including cryptographic information describing how to decrypt the data.

According to the method, in the case of transmitting, the transfer over the network of the data element for incorporation into a packet for wireless transmission occurs in real time during transmit time, including encryption prior to the transfer over the network, or, in the case of receiving, the transfer over the network occurs in real time during receive time, including real-time decryption after the transfer over the network.

Another embodiment is a method implemented in a network device—in one embodiment, a network switch. The network device is coupled via a network link, e.g., a fast enough Ethernet link such as a Gigabit or faster Ethernet link to a station of a wireless network—in one embodiment, an IEEE 802.11 wireless network. The network device includes a memory. The method is of streaming data over the network, link from or to the network device memory during wirelessly transmitting or wirelessly receiving at the station.

The method includes sending information over the network link to the wireless station describing wherefrom to retrieve a data element including at least some of the data for a to-be-wirelessly-transmitted packet in the case of transmitting, or whereto write a data element including at least some of the data from a wirelessly received packet in the case of receiving. The accepted information including information defining a memory location and an amount data in the network device memory for the data element. The method further includes receiving a packet of the first type from the wireless station via the network link. The packet includes the information describing wherefrom to retrieve or whereto write the data element.

In the case of data for a to-be-transmitted packet, the method includes, in response to the receiving of the packet of the first type, retrieving the data element from the memory, forming a packet of a second type that includes the retrieved data; and sending the packet of a second type to the wireless station in response to the receiving of the packet of the first type, such that the transfer of data over the network for incorporation into a packet for wireless transmission occurs in real time during transmit time.

In the case of data from a received packet, the method includes receiving a packet of a second type from the wireless station encapsulating the data element, extracting the encapsulated data from the packet of the second type, and writing the extracted data into the memory according to information in the received packet of the first kind, such that the transfer of data over the network from a wirelessly received packet occurs in real time during receive time.

Other aspects will be clear from the description herein.

DETAILED DESCRIPTION

An aspect of the present invention provides a method and an apparatus that allows data elements for a packet for wireless transmission by a wireless station to be streamed over a network link from a network device remote from a wireless station during transmit time. By remote from a wireless station is meant that the wireless station is connected to the remote device via a packet-network link, such as an Ethernet link. Another aspect of the invention provides for the streaming to include encryption. Another aspect of the present invention provides a method and an apparatus that allows data elements from a wirelessly received packet to be streamed to the remote network device over the network link during receive time such that the data from the received packets can be stored in real time in the remote network device.

Embodiments of the invention will be described in terms of the wireless station being an access point (AP) in a wireless local area network (WLAN). In one embodiment, the remote network device is a network switch coupled by a network link to the wireless access point.

On-the-Flight Data Streaming to and from Host Memory

Figure 2:
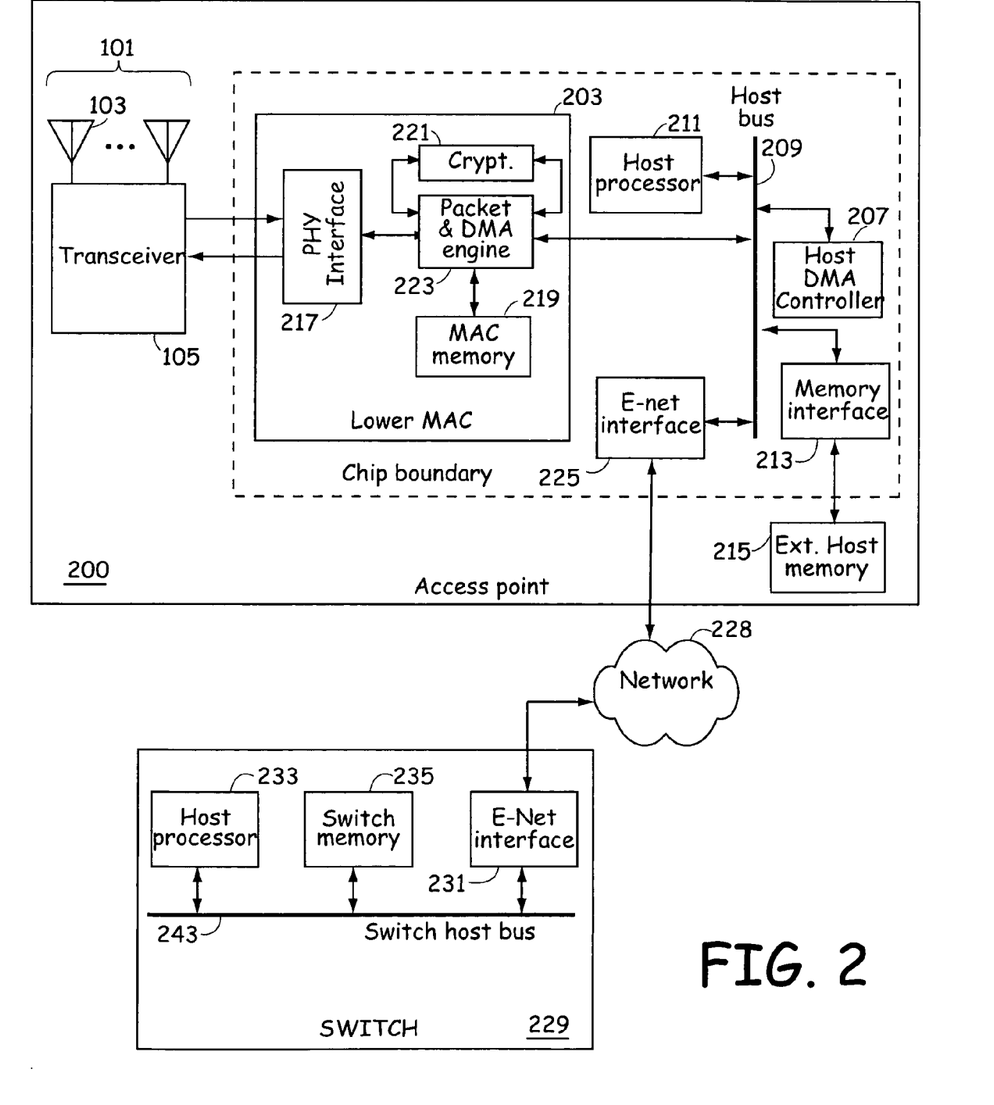
FIG. 2 shows an embodiment of a wireless station for implementing an access point (AP), including a network link to an access point.

FIG. 2 shows a wireless station for implementing an access point (AP) coupled to a network switch 229 via a network link 228, typically a wired network connection such as an Ethernet connection. The MAC processing functions of the station 200 are divided between a "Lower MAC" 203 that implements such aspects as interfacing to the physical radio (the PHY) 101 using a PHY interface 217, encryption/decryption using a cryptography engine 221, and the actual receiving and sending of MAC packets in a MAC packet and DMA engine 223. The "Higher MAC" functions, i.e., the remaining MAC functions, are implemented in software running on a host processor 211. The Lower MAC 203 is coupled to a host processor 211 via a bus subsystem 209. Coupled to the host bus are also a host DMA controller 207 and a host memory interface 213 to which host memory 215 is connected.

One aspect of the invention is moving the encryption/decryption using the cryptography engine to be carried out at the network switch.

In the example in which the station is an access point, the station 200 includes a network interface 225 such as an Ethernet interface connected to the host bus 209. The network interface connects the station 200 to a network 228, e.g., an Ethernet. A switch 229 is shown connected to the network. The switch 229 itself includes a local switch host processor 233 and a switch memory 235 connected via a local switch bus subsystem 243. The switch, for example, may operate under a network operating system such as IOS (Cisco Systems, Inc, San Jose, Calif.). A network interface, e.g., an Ethernet interface 231 connects the switch bus to the network 228.

Suppose by way of example, that the Lower MAC and the host processor are implemented on the same integrated circuit (chip) that includes the memory interface 213. The memory 215 is external memory to the chip.

Various details are not shown in FIG. 2. For example, there may be some cache memory and other internal memory to the host other than the external memory shown.

During transmission, in order to avoid the disadvantages of the MAC processor using its local MAC memory 219 as a memory buffer for packets to be transmitted, an improved implementation uses streaming direct memory access (DMA)—also called "data streaming"—across the bus subsystem and memory interface to directly access data for transmission from the host memory 215 without involving the host processor 211. To provide for this, the packet/DMA engine 223 includes a scatter/gather DMA controller for setting up DMA transfers.

Consider as an example the host processor receiving packets via the network 228 that are for wireless transmission. When the host processor has new packets ready for transmission, it informs the Lower MAC 203 by providing the Lower MAC with information sufficient to set-up the transmission. This information includes the MAC headers for the packets for transmission, the location of any data required for building a MAC packet, and information on how to construct the MAC packet from the data. In one embodiment, the information provided to the Lower MAC 203 by the host includes a set of data structures—called "buffer descriptors" herein-that include where the data for the MAC packets is located, e.g., in the host memory 215.

The Lower MAC 203 extracts and stores locally in its MAC memory 219 the headers of the packets for transmission. The buffer descriptors for each MAC packet are also stored with the MAC packet's MAC header locally in the MAC memory 219. Once the headers are in the local MAC memory 219, the Lower MAC 203 assumes control of those packets for transmission.

Each buffer descriptor data structure includes fields defining a contiguous amount of memory, and includes an address pointer field and a data length field. The content of the address pointer field points to a location in memory and the data length field provides the amount (the length) of data starting at the address pointed to by the pointer. A complete MAC packet includes a plurality of such buffer descriptors, called a "buffer descriptor chain" herein, that together describe where the data for the to-be-transmitted MAC packet resides. That is, a set of buffer descriptors, each defining a contiguous amount of data, together define a not-necessarily-contiguous set of data for forming the MAC packet for transmission.

Note that there similarly is also defined a receive buffer descriptor chain of receive buffer descriptors that describes where the data of packet that is received is to be stored.

The station 200 has a memory map that defines where each address resides, e.g., in the local MAC memory or on the host memory 215.

The scatter/gather DMA controller of packet/DMA engine 223 is used to set up DMA data transfers of data that is written to or read from not-necessarily-contiguous areas of memory. A scatter/gather list is a list of vectors, each of which gives the location and length of one segment in the overall read or write request. Thus, each buffer descriptor chain for a MAC packet for transmission includes information sufficient for the packet/DMA engine 223 to build a scatter/gather list. The packet/DMA engine 223 interprets the buffer descriptor chain to form a scatter/gather list. The packet/DMA engine 223 is also responsible for following the transmission schedule, and transmitting MAC packets via the PHY interface according to the schedule.

When a MAC packet needs to be transmitted, the packet/DMA engine 223 sets up a scatter/gather list from the buffer descriptor chain. Each vector corresponds to a buffer descriptor and describes the blocks of memory defined the buffer descriptor. The packet/DMA engine 223 is in communication with the host DMA controller and sets up the transfers with the host DMA controller according to the transmitting schedule.

Once set-up, the transfer occurs from the host memory and/or local MAC memory to form the MAC packets for transmission in real time.

Consider a single transfer of a contiguous amount of memory as described in a single buffer descriptor. The packet/DMA engine 223 communicates the DMA information the vector via the host bus 209 to the host DMA controller 207. The host DMA controller is in communication with the memory interface 213 and retrieves the data and transmits the data via the bus to the packet/DMA engine 223.

For transmission, the data may pass through the cryptography engine as required and then via the PHY interface for transmission via the transmit part of the PHY 101.

In this manner, the miss situation of the prior-art method that includes the host predicting and pre-loading the local MAC memory with to-be-transmitted packets is avoided.

When receiving data, the process is basically reversed. In an information exchange, the lower MAC receives from the host processor 211 the addresses where packets that are received in may be stored. In particular, the Lower MAC 203 maintains a set of receive buffer descriptor chains for receiving packets. A receive buffer descriptor chain includes receive buffer descriptors that indicate where in the host memory 215 the data for received packets may be stored. When data is received via the PHY interface 217, the packet/DMA engine 223 sets us the data transfer, including possibly passing through the cryptography engine 221 for decryption. The DMA engine in the packet/DMA engine sets up the required scatter/gather list for DMA transfers and communicates this information to the Host DMA controller. The host DMA controller has access to a memory map that indicates where in memory, e.g., on the host memory 215, the data is to be written, and sets up the each DMA transfer to host memory.

Streaming, including Encryption, over the Wired Network

There is a general desire in the art to move more of the functionality of the wireless station to a network device, e.g., to the network switch 229 coupled to the station via a network link. One aspect of the present invention includes encryption of the data as it is being streamed across the network connection, such that the wireless station need not keep any unencrypted to-be-transmitted packets or keys.

The system shown in FIG. 2 requires the data for to-be-transmitted packets to be queued at the station, e.g., in host memory 215, and to be available for transmission in the host memory 215. Furthermore, encryption and decryption occur using the cryptography engine 221.

An aspect of the Parent Application includes on-the-fly data streaming over a network link that provides for data for inclusion in a packet for wireless transmission to be streamed directly from a network switch during transmit time without necessarily requiring queuing in the transmitting wireless station. Another aspect of the invention provides for the to be transmitted packets to be encrypted in transmit time during the streaming process, and for the received packets to be decrypted in receive time during the streaming process.

Figure 3:
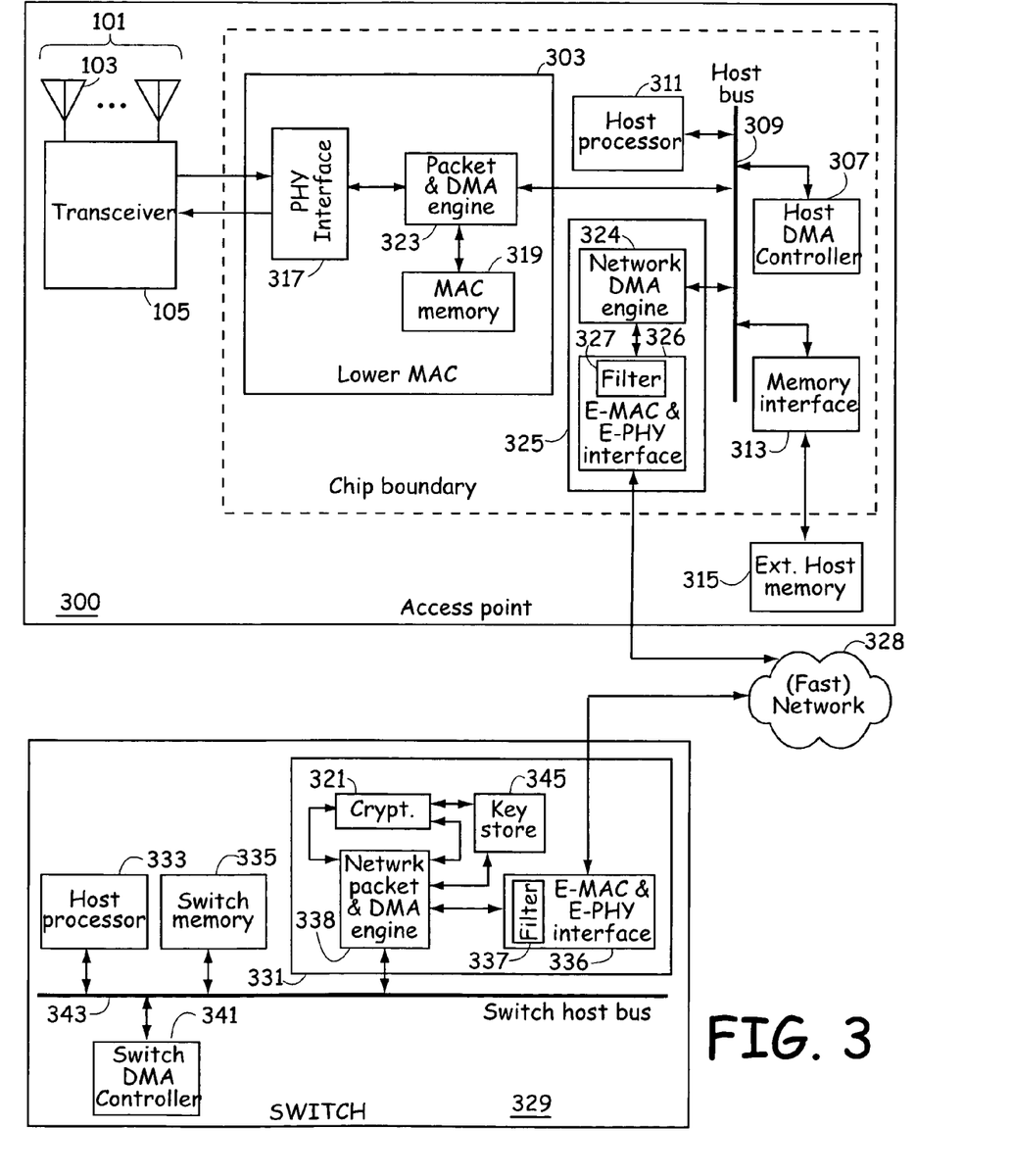
FIG. 3 shows an embodiment of a wireless station for implementing an access point (AP), including a network link to an access point.

FIG. 3 shows an apparatus that embodies aspects of the present invention. The general architecture is similar to that shown in FIG. 2, except that some of the functionality of the host processor is transferred to a network device, e.g., a network switch that is coupled to the wireless station via a wired network, and furthermore, that the encryption engine is now at the switch rather than the station. That is, a wireless station 300 includes a lower MAC 303 that in turn includes a packet/DMA engine 323, and a local MAC memory 319. Unlike the case with the Parent Application, the lower MAC 303 need not include an encryption/description engine. The station 300 also includes a host processor on a host bus subsystem 309. A memory interface 319, and a host DMA controller 307 are connected to the host bus 309. The lower MAC is coupled to the host bus 309, in one embodiment via the packet/DMA engine 323.

The station 300 is coupled to a network switch 329 via a network link 328 that is coupled to the host bus subsystem 309 via a network interface 325 coupled to the host bus 309.

The switch 329 includes a local switch bus subsystem 343 that connects a switch host processor 333 with a switch memory 335. In one embodiment, the switch further includes a switch DMA controller 341 coupled to the switch bus 343 and able to cause DMA transfers with the local switch memory 335. A network interface 331 connects the switch to the network 328.

In one embodiment, the host 333 of the switch 329 runs on a network operating system: IOS (Cisco Systems, Inc., San Jose, Calif.).

Note that even though the architecture of the station 200 of FIG. 2 and that of FIG. 3 is similar, the functionality however is different in that some of the higher MAC functions are now carried out in a network switch 329. Thus, different reference numerals are used in FIGS. 2 and 3 for all elements other than the PHY 101. Some of the elements, however, may be identical, as would be clear to those in the art.

One aspect of the invention is that at least some of the data of MAC packets that are for wireless transmission are streamed during transmit time across the network link 328 from the switch memory to the lower MAC 303 for transmission by the PHY 101 such that data does not need to be queued in the host memory. Another aspect is that at least some of the data of MAC packets that are for wireless transmission are encrypted during the streaming process. Another aspect is that data received by the PHY 101 may be directly streamed to the switch during transmit time across the network link 328 such that received data need not be queued in the host memory. The inventors recognize that wired networks are becoming sufficiently fast to provide such streaming. In the preferred embodiment, the network 328 is a Gigabit Ethernet network. Of course, that means any Ethernet network link at least as fast as an Ethernet network link may be substituted and is within the scope of the term "Gigabit Ethernet" for purposes of the invention. Note that the invention is not restricted to an Ethernet connection. Any network connection, e.g., a token ring based connection, or some other network connection may be used.

In order to provide the streaming feature, one embodiment of the invention includes network DMA engine 324 in the station, and the matching network DMA engine 338 in the switch. In the case of the station 300, the network interface 325 includes a network MAC and PHY interface 326 and the network DMA engine 324. On the bus side, the network DMA engine 324 appears as a memory interface. The host DMA controller 307 is in communication with the network DMA engine 324 as if it was a memory interface device and further is in communication with the memory interface 313. A memory map in the access point indicates which memory addresses are handled by the memory interface 313 and which are handled by the network DMA engine 324.

In the switch, the network interface 331 includes a network DMA engine 338 and a network MAC and PHY interface 336. On the switch bus side, the network DMA engine 338 appears as a memory controller. A switch memory map indicates which addresses are in the local switch memory 335, and which are handled by the network DMA engine 338.

Furthermore, in order to provide the in-line encryption and decryption during streaming across the network line to or from the station 300 at transmit or receive time, respectively, the network interface 331 includes a cryptography engine 321 and a memory device that maintains a key store 345 of cryptographic keys and cryptographic methods. The key store 345 stores an indexed set of keys. In one embodiment, the key store 345 stores the keys and cryptographic methods as an indexed table data structure.

In the case of transmission, when the host DMA controller 307 receives a memory request, e.g., set up by the packet/DMA engine 323 of the lower MAC, it communicates with either the network DMA engine 324 or the memory interface 313 according to the address. Normally, the packet/DMA engine 323 sets up DMA transfers via the network DMA engine 324. The DMA controller 307 need not be aware that any data requested from the network DMA engine 324 actually comes from across a network link.

Note that while in one embodiment, the address indicates to the DMA controller 307 whether a DMA transfer is to or from the DMA engine 324 or the memory interface 313, in an alternate embodiment, a separate indication, e.g., a control bit is used to indicate whether a DMA transfer is to or from the DMA engine 324 or the memory interface 313.

Similarly, the switch DMA controller 341 treats the switch network DMA engine 338 as if it is a memory interface device, and need not be aware that any data transfer travels across the network link 328.

Another aspect of the invention is the process carried out by the network DMA engines 324 and 338 of the station host and switch, respectively. The Parent Application described an aspect of the invention that defined network packet types that are used for setting up the network streaming, and for carrying data during such streaming. Yet another aspect of the Parent Application is the receive filtering carried out by filters 327 and 337, respectively, of the network MAC and PHY interfaces 326 and 336 of the station host and switch, respectively. One aspect of the present invention includes the switch storing an indexed set of keys, e.g., in the key store 345. Another aspect includes introducing new special packets to provide sufficient information for the data of to-be-transmitted packet to be encrypted during the streaming to the AP. Such a new special packet provides information sufficient to set up the cryptography. Such information includes one or more of a key index to locate the cryptographic key in the key store, an indication of the cryptography method to use, and an indication of the integrity mode to use. So now prior to being streamed on demand at transmit time, the switch sets up the encryption engine 321 to carry out the required encryption during transmit. Similarly, decryption may be set for reception of encrypted information, and the decryption thereof by the encryption engine 321 during the streaming from the station to the switch 329.

These aspects will first be described in the context of a set of packets that are for wireless transmission by the wireless station 300.

Consider first the operation during transmit of the embodiment shown in FIG. 2. In this case, the switch 229 routes any packets that are for transmission by the wireless station 200 to the wireless station. Such packets are queued in the host processing system, e.g., in the host memory 215, and the host communicates with the lower MAC 203 to set up DMA transfers of data in the host memory, as required, e.g., by communicating the packet headers and the set of buffer descriptors (the buffer descriptor chain) for each packet.

By contrast, in one embodiment of the present invention, when the switch 329 has packets that are for transmission by the wireless station 300, the switch 329 sends the information on the packets for transmission, e.g., the header information and the buffer descriptor chain for each to-be-transmitted packet to the station via the network 328. Such information is communicated to the lower via the host bus 309. The host plays little role in this. Furthermore, encryption information is received from the station or default values used, e.g., previously received from the station or from another entity. Such information is used to set up the in-line encryption.

In an alternate embodiment of the invention, the host receives information on where at least some of the data for a packet for transmission exists in the switch, and the host is involved in the setting up of the buffer descriptor chain using such data sent by the switch. However, the data itself remains in the switch until streamed for transmission. For example, the host interprets information sent from the switch as information for the lower MAC on packets for transmission and passes this information to the lower MAC.

When the lower MAC 303 receives the header information and the descriptor chain for the packets for transmission, the lower MAC stores the headers and the associated information in its local MAC memory 319 and schedules the transmission. At the start of transmit time, the MAC packet/DMA engine 323 sets up for scatter/gather DMA access of data needed to build each packet. The MAC packet/DMA engine 323 sends each request in the scatter/gather to the host DMA controller 307. These requests are interpreted by the DMA controller 307 and communicated to the memory interface 313 or Network DMA engine 324 depending on the address. Thus, the host DMA controller 307 treats network DMA engine 324 as a memory interface for a pre-defined range of addresses that are outside the address range of the host memory 313.

For each memory request, the Network DMA engine 324 sets up the network transfer by setting up packets of a first special type that are control packets that describe up the memory request in the form of the required memory transfer from the memory of the switch. The special packets include pointer data pointing to a location in the switch memory, and length information. These special-type packets are transmitted to the switch via the network 328.

One aspect of the present invention is that these special type packets may also include information on the encryption to be carried out, if any, during the data transfer.

The network MAC and PHY interface 336 interprets all packets it receives. In one embodiment, the network MAC and PHY interface 336 includes a filter 337 that indicates to the network DMA engine 338 information from special-type packets it receives for further processing by the network DMA controller 338. The non-special-type packets are processed normally and passed on.

The network DMA engine interprets the information from special-type packets to translate the control information and communicate information to the switch DMA controller 341 to set up a DMA transfer from the switch memory 335 according to the information in the control packets. The DMA transfer is set up to destination addresses that are understood by the switch 329 to be addresses handled by the network DMA controller 338. The network DMA controller 338 appears to the switch DMA controller 338 as a memory interface.

The network DMA engine interprets the encryption information from special-type packets to set up for encryption during the streaming.

The data that is aimed at the Lower MAC 303 is encapsulated by the network DMA engine 338 of the switch as packets of a second special type: streaming data encapsulating packets. The information to be encapsulated is passed through the encryption engine according to the encryption instructions provided. Each streaming data encapsulating packet includes the original pointer and length data element of the corresponding request packet and is sent to the access point 300 via the network 328 and received via the Network MAC and PHY interface 326.

The Network MAC and PHY interface 326 includes a filter 327 that indicates to the network DMA engine 324 those packets that are to be processed by the network DMA controller 324, i.e., the second special-type packets. Non-special-type packets are processed normally by the Network MAC and PHY interface.

The network DMA engine 324 interprets the information in the second special-type packets, i.e., in the streaming data encapsulating packets that contain the encapsulated information, encrypted in the case in-line encryption was included. One aspect is that the pointer and length information in the second-type-special packets is used to match the packet as a response to a DMA request. The network DMA engine 324 removes the data—possibly encrypted data—and communicates them via the bus 309 as responses to the matching DMA requests. To the host system bus, these appear as regular DMA responses transfers set up by the host DMA controller 307, since for such transfers, the network DMA engine 324 is set up as if it was a memory interface.

The DMA controller 307 routes the fetched data to the requesting packet/DMA engine of the Lower MAC, just as it would for any DMA request.

Figure 4A:
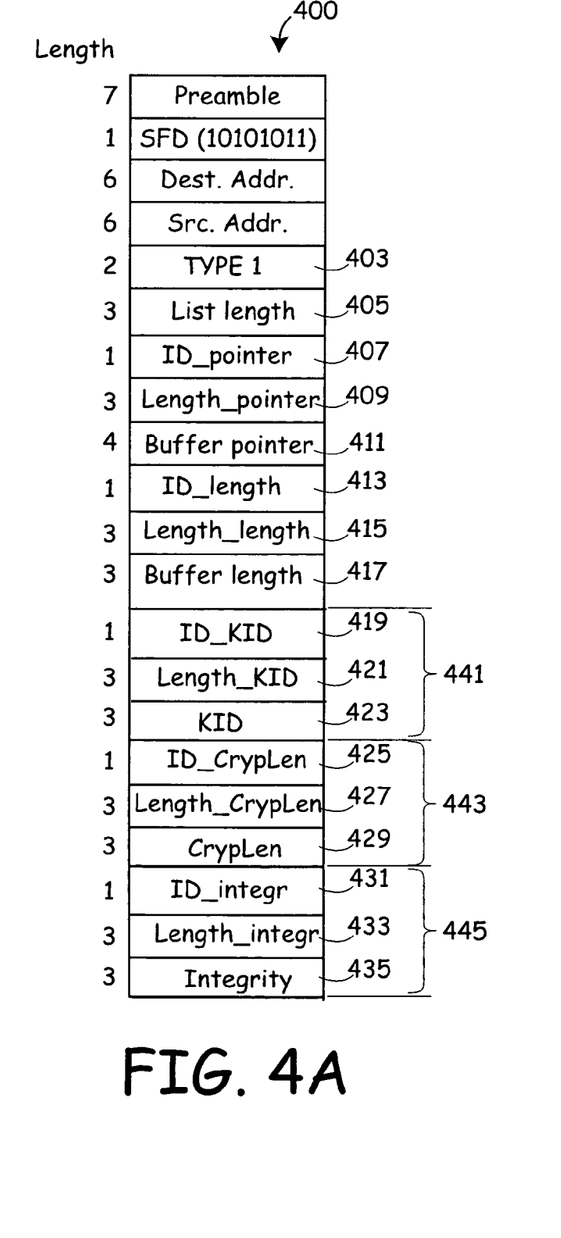
FIGS. 4A and 4B respectively show an Ethernet packet of the first and second special types, according to an aspect of the present invention.
Figure 4B:
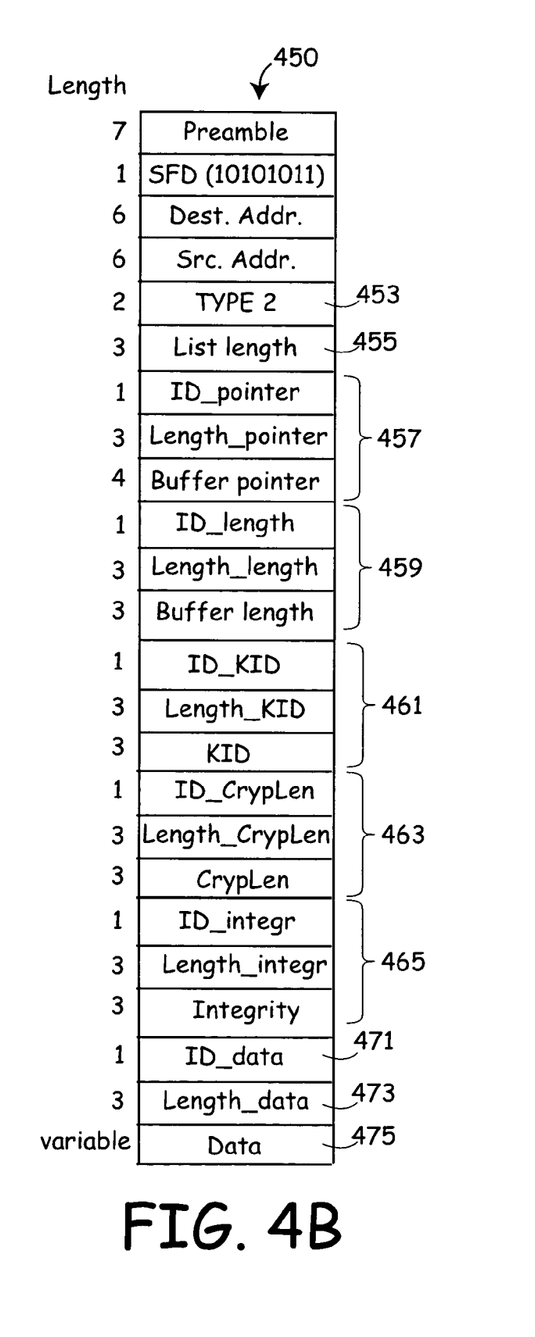

FIGS. 4A and 4B show the structures of the two special types of packets. These are standard IEEE 802.3 frames that include TYPE fields whose respective contents are two unique previously undefined values, used to define the packet of the first type and second type, respectively.

FIG. 4A shows a packet 400 of the first kind. This structure is similar to the packet 400 of the first kind described in the Parent Application, except that additional fields are now provided for sending the cryptographic information.

In an alternate embodiment, the two special packets of the first and second kind as described in the Parent Application are used when no in-line cryptography is included, and a special new additional kind of packet is defined when the additional cryptographic information needs to be sent. This description, however, assumes that the packet 400 of the first kind is used whether or not cryptography is included.

The preamble, start of frame delimiter, destination address, and source address fields are standard. For example, the source address is of the station 300, and the destination address is of the switch 329. The next field 403 is used as a TYPE field and includes a code, denoted TYPE-1, for a new type. Any previously unused value that is large enough such that it defines a type, and that is not used for other purposes, may be used here. The remaining part of the packet 400 provides the pointer and length information for the data transfer. This is done using a standard information element list structure that starts with a List length field 405 that indicates the length of the list, and then a set of type/length/value triplets for each element, in this case, for the pointer element and the length element. Thus, following the List length field 405 is a field 407 carrying an identifier, denoted ID_pointer that identifies the element as the pointer, then a field 409 denoted Length_pointer indicating the length of the pointer data. The next field 411 is the pointer data itself, i.e., the address in the switch memory from where to fetch the data. Following the pointer data field 411 is a field 413 carrying an identifier, denoted ID_length that identifies the element as the length of the data to fetch, then a field 415 denoted Length_ length indicating the length of the length information. The next field 417 is the length information itself, i.e., the length of the data to fetch from the switch memory.

Note that the inventors decided to use packets that include a flexible information element list structure in order to provide for flexibility in how these packets are used in the future. In an alternate embodiment, simpler fixed length packets are used that include, e.g., only the buffer pointer and the buffer length information following the TYPE field 403, when no cryptographic information, and additional cryptographic information for the case in-line encrypting during the streaming across the network link is included.

One aspect of the invention is that additional type/length/ value triplets are provided for the parameters defining the required cryptography, e.g., encrypting of to-be-transmitted packets or packet parts, and decrypting of encrypted received packets or packet parts. In one embodiment, the presence of the additional type/length/value triplets for cryptography causes the switch to carry out the requested cryptography. In the embodiment preferred, a packet 400 of the first kind always includes information to be passed to the cryptographic engine 321. One set of such data is pre-defined to do no encryption. Furthermore, if the engine 321 is properly configured via the type/length/value triplets, then some cryptographic operation will occur. If it is not configured, or improperly configured, then it should act as a NULL encrypt operation and pass through the data unaffected.

The packet 400 of the first kind of FIG. 4A includes three additional type/length/value triplets for three encryption parameters. The first triplet 441 defined the key identifier, which is the pointer to the key store 345. The first element ID_KID 419 identifies the element as the key identifier (KID), then a field 421 denoted Length_KID indicating the length of the key pointer data (the KID). The next field 423 is the key identifier (KID) itself that points to the key in the key store 345.

The next triplet 443 defines the encryption method used, and the key length for the method. The different cryptography methods, and the different key lengths are also stored in the key store 345, so that the information transmitted by the triplet 443 is also in the form of a pointer to the table. The first element ID_CrypLen 425 identifies the element as one for the method and key length, then a field 427 denoted Length_CrypLen indicating the length of the method and key length data. The next field 429 is the pointer itself that points to the cryptographic method and the key length in the key store 345. This identifies the cryptographic method and the key length to be used for the encryption (or decryption in the case of receiving). In an alternate embodiment, two triplets are used, rather than one, to define the cryptographic method and the length of the key: one triplet for the method, and another triplet for the key length.

FIG. 4A shows another triplet 445 describing the integrity and-key management used. In one embodiment, the information transmitted by the triplet 445 is also in the form of a pointer to the table in the switch that describes different methods. The first element ID_Integr 431 identifies the element as one for the integrity and/or authentication method, then a field 433 denoted Length_Integr indicates the length of the integrity and/or authentication method data. The next field 435 is the pointer itself that points to the cryptographic integrity and/or authentication method in the key store 345. This identifies the integrity and/or authentication method to be used for the encryption (or decryption in the case of receiving).

In alternate embodiments, more or fewer triplets are used. For example, a separate triplet may be used for the integrity, and yet another for the authentication.

Wireless security is evolving. Many cryptography options are available and new ones are being developed and introduced, as would be known to those in the art. One aspect of the invention is that many different forms of cryptography and authentication may be provided using the structure described. The methods and apparatuses described herein are not to be interpreted as being restricted to one method or another. In the case of a wireless network that conforms to the IEEE 802.11 standard, one or more the following methods may be used: RC4, AES-CTR, AES-CBC. The invention is not limited to any particular method.

Depending on the application and comfort level, there are many ways to secure wireless LANs. WLAN security not only involves data encryption, but also message integrity checking (MIC) and mutual authentication.

A brief discussion follows, and many of these subjects would be known to those in the art.

Static Wired Equivalent Privacy (WEP) protocol provides a certain amount of security. With static WEP, all users and all APs they associate with have the same encryption key. This reduces security by enabling the key to be broken by tools, e.g., tools freely available on the Internet. Static WEP also provides no message integrity and no authentication.

Dynamic WEP improves on static WEP by giving each user a unique unicast key and all users the same broadcast key. The AP maintains unicast keys for users and broadcast keys for VLANs. Dynamic WEP is stronger than static WEP. However, there still are tools available for breaking such a method. Dynamic WEP has no message integrity but offers strong mutual authentication using 802.1X and the Extensible Authentication Protocol (EAP).

Temporal Key Integrity Protocol (TKIP) is regarded as an improvement on dynamic WEP but does not solve all security problems. It was designed as a stopgap measure to overcome the weaknesses in WEP, both static and dynamic. TKIP improves security by fixing some problems WEP had with cryptographic primitives. TKIP includes a built-in message integrity check called "Michael." While TKIP closes the routes of attack that were open with WEP, it also opens one of its own. Some believe that the Michael integrity check is cryptographically weak and that, with considerable effort, messages can be forged.

To prevent this from happening, TKIP includes a countermeasure that requires an AP to shut down an entire basic service set (BSS) for 60 seconds if two MIC failures are detected within one minute of each other. This makes AP susceptible to denial-of-service (DoS) attacks. Like dynamic WEP, TKIP provides strong mutual authentication by implementing 802.1X and EAP.

For maximum security, the IEEE 802.11i Counter mode/CBC-MAC Protocol (CCMP) offers encryption and message authentication based on the Advanced Encryption Standard (AES). CCMP uses the counter mode in AES for data encryption and the Cipher Block Chaining-Message Authentication Code (CBC-MAC) in AES for message integrity. A strong and secure algorithm, AES was heavily analyzed by cryptographic experts from around the world.

Because the cryptographic exchange mechanism described by a special packet of the first kind allows for as many additional type/length/value triplets as required for cryptography, one aspect of the invention is the ability to accommodate all these different methods.

For example, possible cryptography options for a wireless network that conforms to the IEEE 802.11 standard include: RC4, AES-CTR, AES-CBC. Possible integrity options for a wireless network that conforms to the IEEE 802.11 standard include: Michael, AES-CBC-MAC. The invention is not limited to any particular method.

Regarding key management, today key management is handled by an AP. Sometimes the client station derives a key between itself and an authentication server. That authentication server then passes the key to the AP. In an alternative arrangement, the AP and the client station may mutually derive the key.

Because aspects of the present invention provide for the edge switch to maintain keys, rather than the AP, and because of the flexibility afforded by the structure described herein, different implementations allow for different levels of the split of knowledge between the AP and switch.

FIG. 4B shows a packet 450 of the second kind that the network DMA engine 338 sets up for sending data defined in the control packet 400 of the first kind. The preamble, start of frame delimiter, destination address, and source address fields are again standard. For example, the source address is of the switch 329, and the destination address is of the station 300. The next field 453 is used as a TYPE field and includes a code, denoted TYPE-2, for another new type different than that used in the control packet 400. Any previously unused value that is large enough such that it defines a type, and that is not used for other purposes, may be used here. The remaining part of the packet 450 provides the pointer and length information for the data transfer. A List length field 455 indicates the length of the list, which in the case of this packet 450, depends on the amount of data being sent. Following the List length field 455 is a set of type/length/value triplets for each element, in this case, the pointer element, the length element, and the data being transferred. The type/length/value triplets 457 and 459 for the pointer and the lengths, respectively, are the same as in the corresponding control packet 400 that requested the data included. Then the cryptographic information type/length/value triplets 461, 463, and 465 follow. Following the cryptographic information is a field 471 carrying an identifier, denoted ID_data that identifies the element as the data being transferred, then a field 473 denoted Length_data indicating the length of the data. The next field 475 is the data from the switch memory that is being transferred.

Thus, for the transmit path, the AP 300 generates the memory request. The smart DMA engine 324 includes signaling methods to pass the cryptographic details in the form of the additional triplets. In one embodiment, these are as described above and convey a pointer or pointers to the key store 345. In another embodiment, the cryptographic information includes triplets for one or more pointers to where the cryptographic information is stored in the memory of the switch 335. In yet another embodiment, the cryptographic information, in the form pointer or pointers to the key store 345, are maintained in the local host memory 315 of the AP, and of the values of the pointers are encapsulated as triplets for the cryptographic information by the network DMA engine when forming the special packets of the first kind to initiate a streaming network DMA request. Thus, the additional cryptographic information in the additional type/length/value triplets are added to the request. The filter 337 in the switch recognizes packets of the special type and sets up the network packet and DMA engine 338 to carry out the DMA transfer from the switch memory. Furthermore, using the additional type/length/value triplets for cryptography, in response to the network packet the DMA engine also sets up the cryptography engine 321 to encrypt as requested according to information stored in the key store 345.

Note that when sending the data, the packets of the second type are used. As in the Parent Application, one embodiment sends only the data. The pointer and length triplets are used to act as a reference for the AP to identify the response. Thus, in one embodiment, when forming the response to a request for to-be-transmitted data, the switch uses the request as is, and simply changes the type from request (first kind special packet) to response (second kind special packet) and appends the data type/length/value triplet, leaving all others in tact.

Note that the above description corresponds to these packets being used for a memory fetch set up by the host DMA controller 307.

The same special-type packets—just one of them in one embodiment—may be used for a DMA data write that is set up in the case of the station 300 receiving data.

In the case of receiving, the switch 329 sends information and the station 300 accepts information describing where in the switch memory 335 to write data elements of wirelessly received packets, e.g., received buffer descriptor chains of received buffer descriptors for received packets. Each received buffer descriptor defines a switch memory location and an amount data in the switch memory for a data element.

In addition, according to one aspect of the invention, cryptographic information necessary to decrypt the data is included in the packets of the first and second kind.

The received buffer descriptor chains are stored in the Lower MAC memory 319.

When a packet is received, the packet/DMA engine 323 sets up scatter/gather DMA transfer of the data elements from the wirelessly received packet. The information for the DMA transfer is communicated to the host DMA controller 307 that sets up the individual data element transfers. The actual data transfer occurs as a data stream during receive time and includes the extraction of the data element from the wirelessly received packet, and then the transfer via the host bus as a DMA transfer to the network DMA engine 324 (recall, this appears as a memory interface to the host bus and DMA controller).

In a Lower MAC engine in which encryption occurs at the wireless station, according to the cryptographic requirement, the data might be passed through an encryption engine coupled to the packet and DMA engine at the lower MAC. According to an aspect of the present invention, the decrypting, however, is carried out in the switch, across the network connection 328. Thus, the cryptographic information is passed so that the encryption engine 321 carried out any decryption.

Consider the transfer of a single block of data to be written into a contiguous block of memory addresses in the switch memory 335. From the pointer address in the DMA request, the host DMA controller 307 ascertains that the address is for the network DMA engine 324 that appears to the DMA controller 307 as a memory interface for a range of addresses.

The DMA request from the host DMA controller 307 is translated by the network DMA engine 324 to a packet of the second special type that includes the pointer and length data for the transfer, and the data element of the transfer to be written into the switch memory. Furthermore, the cryptographic information needed to decrypt the packet is also included in the form of additional triplets. The packet of the second type, including the cryptographic information, is sent to the switch 329 via the network via the Ethernet MAC and PHY interface and the network link 328.

At the switch, the packet of the second type is received by the Ethernet MAC and PHY interface 336 that includes a filter 337 that filters out the packet of the second type and passes the information therein, including the data, to the network DMA engine 338. The network DMA engine 338 interprets the request and sets up for, and writes the data to the memory location in the switch memory 335. In addition, prior to the writing, the network DMA engine 338 interprets the cryptographic information and sets up the encryption engine 321, and the pointers to the data in the key store 345, to carry out the required decrypting operations during the writing of the data to the memory location in the switch memory 335.

Thus, the streaming of data over the network from a wireless station to the switch memory occurs in real time during receive time, including decrypting of the data on-the-fly during receive time.

Note that while in the embodiment shown, the network DMA engines 324 and 338 in the switch and wireless station, respectively, that interpret the special packets and convert them to memory stream requests are each shown as part of the packet engines of network controllers, in alternate embodiments, these aspects are carried out in a separate device in each of the switch and wireless stations.

While today's processors are such that the network DMA engines 324 and 338, and encryption engine 321 are likely to be in special hardware, the inventors recognize that programmable processors in the future may be fast enough to implement such a network DMA engine. Thus, the network DMA and encryption/decryption function may be implemented in hardware, in software (including firmware) as one or more code segments that execute on a programmable processor, or in a combination of hardware and software.

Similarly, while in one embodiment, the packet/DMA engine 323 is implemented in hardware, the inventors recognize that programmable processors in the future may be fast enough to implement such some or all of the functionality of the packet/DMA engine 323. Thus, the packet/DMA engine function may be implemented in hardware, in software (including firmware) as one or more machine readable code segments that execute on a programmable processor, or in a combination of hardware and software.

Note further that while the embodiment shown includes the key store as separate hardware element in the unit 331, in an alternate embodiment, the encryption data of store 345 may be stored as a data structure as part of the switch memory 335.

FIG. 3 shows the chip boundary for the access point chip that includes the lower Mac and the MAC host. In one embodiment, host processor 311 is a MIPS 5K processor core and the host bus is a "SOC-it" bus (both MIPS Technologies, Inc. Mountain View, Calif.).

During transmit time means during the time the packet that includes the data being streamed is being transmitted. For example, "during transmit time" excludes the case of the data being streamed for inclusion in the packet being queued in the host memory of the station for later transmission.

During receive time means at the time the packet is being received, e.g., in the case there is only one MAC processor, prior to the next received packet is processed at the MAC level by the MAC processor.

One embodiment of each of the methods described herein is in the form of a set of instructions that instruct a machine to implement a method. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processor of a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including memory.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

It should further be appreciated that although the invention has been described in the context of a network switch coupled to an access point, the invention is not limited to such contexts and may be utilized in various other applications and systems, for example in a system that includes any wireless station coupled to any network device via a network link. Furthermore, the invention is not limited to any one type of network architecture and method of encapsulation, and thus may be utilized in conjunction with one or a combination of other network architectures/protocols.

Note that the inventors found that for the presently available IEEE 802.11 standards, an Ethernet that is at least as fast as a Gigabit Ethernet provides the required latency time. The invention, however, is not restricted to using an Ethernet for the link between the station and the network device, and also for using a Gigabit Ethernet or faster link. For example, a wireless network protocol may be used that is slow enough such that a 100 MB Ethernet link may be used. Also, faster wireless protocols may be introduced that require a link of at least a 10GB Ethernet. All these are meant to be included in the scope of the invention.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method of operating a wireless transmitter coupled to a network device by a packetized network link, the method comprising:
    streaming a data element including at least some of the contents of a wireless network packet over the packetized network link during wireless transmit time of the wireless network packet by the wireless transmitter receiving the streamed data element via the packetized network, the streaming including real-time encrypting the data prior to the transfer over the network link; and
    wirelessly transmitting the wireless network packet of information while the streaming occurs,
  such that the wirelessly transmitting of the packet occurs while at least part of the wireless network packet is being streamed over the packetized network link.

2. A method as recited in claim 1,
    wherein the wireless transmitter is part of a station of a wireless network and the streaming is to the station from the network device coupled to the station by the packetized network link, and
    wherein the network device includes a memory wherefrom data is streamed during the wireless transmitting of the wireless packet,
    the method further comprising:
        forming a DMA request for said data element and encryption information;

converting the formed DMA request and the encryption information to a first packet for transport over the network link;

sending the first packet to the network device over the packetized network link;

receiving a second packet over the packetized network link from the network device, said second packet containing said data element encrypted according to the encryption information; and responding to the formed DMA request with said data element from the second packet, such that the streaming of said data element of the data over the packetized network link uses the second packet, and such that the encryption occurs in real time at the network device during the streaming.

3. A method as recited in claim 1, wherein the wireless transmitter is part of a wireless station that includes a media access control (MAC) processor, wherein the wireless network packet is a MAC packet according to a wireless standard, wherein the wireless station is coupled by the network link to a network device, such that the real-time encrypting occurs in the network device outside the wireless station.

4. A method as recited in claim 1, wherein the wireless transmitter is part of a wireless station that includes the wireless transmitter and a media access control (MAC) processor, wherein the wireless network packet is a MAC packet according to a wireless standard, wherein the wireless station is coupled by the network link to the network device by the packetized network link, wherein the network device includes a memory, wherein the real-time encrypting occurs in the network device outside the wireless station, and wherein the streaming is via direct memory access from the memory.

5. A method as recited in claim 3, wherein the network device is a network switch that includes a memory wherefrom data is streamed during the wireless transmitting of the MAC packet.

6. A method as recited in claim 5, wherein the network device is a network switch that includes a memory whereto data is streamed during the wireless receiving of the MAC packet.

7. A method of operating a wireless receiver, the method comprising:

wirelessly receiving a wireless network packet of information at the wireless receiver;

streaming a data element including at least some of the contents of the wireless network packet over a packetized network link to a network device coupled to the wireless receiver by the packetized network, the streaming of the data element during receive time of wirelessly receiving the wireless network packet;

wherein the data element is streamed in encrypted form and is decrypted in real time during the streaming, the decrypting after transfer over the packetized network link such that the wirelessly receiving of the wireless network packet occurs while at least part of the wireless network packet is being streamed over the packetized network link.

8. A method as recited in claim 7, wherein the wirelessly receiving is by a station of a wireless network, the station including the wireless receiver and the streaming is from the station to the network device coupled to the station by the packetized network link, and wherein the network device includes a memory whereto data is streamed during the wirelessly receiving of the wireless network packet, the method further comprising:

forming a DMA request for writing said data element and encryption information;

converting the formed DMA request and the encryption information to a first packet for transport over the network link;

sending the first packet to the network device over the packetized network link;

encapsulating said data element encrypted according to the encryption information into a second packet for transport over the network link to the network device; and sending the second packet over the network link to the network device for writing into the memory of the network device according to the formed DMA request, such that the streaming of said data element of the data uses the second packet.

9. A method as recited in claim 7, wherein the wireless receiver is part of a wireless station that includes a media access control (MAC) processor, wherein the wireless network packet is a MAC packet according to a wireless standard, wherein the wireless station is coupled by the network link to the network device, such that the real-time decrypting occurs in the network device outside the wireless station.

10. A method as recited in claim 7, wherein the wireless receiver is part of a wireless station that includes a media access control (MAC) processor, wherein the wireless network packet is a MAC packet according to a wireless standard, wherein the wireless station is coupled by the network link to the network device, wherein the network device includes a memory, wherein the real-time decrypting occurs in the network device outside the wireless station, and wherein the streaming is via direct memory access to the memory.

11. An apparatus to wirelessly transmit a wireless network packet, the apparatus coupled to a network device by a packetized network link, the apparatus comprising:

means for wirelessly transmitting a wireless network packet; and means for streaming a data element, including at least some of the contents of the wireless network packet, over the packetized network link during the time the means for wirelessly transmitting is wirelessly transmitting the wireless network packet, wherein the streaming includes real-time encrypting the data prior to the transfer over the packetized network link, such that the wirelessly transmitting of the wireless network packet occurs while at least part of the wireless network packet is being streamed over the packetized network link.

12. A computer-readable storage medium having encoded thereon machine executable instructions that when executed cause carrying out a method of wirelessly transmitting a wireless network packet by a wireless transmitter coupled to a network device by a packetized network link, the method including:

streaming a data element, including at least some of the contents of the wireless network packet, over a network link during wireless transmit time of the wireless network packet, the streaming including real-time encrypting the data prior to the transfer over the network link, such that the wirelessly transmitting of the wireless network packet occurs while at least part of the wireless network packet is being streamed over the packetized network link.

13. A computer readable storage medium as recited in claim 12,
  wherein the wireless transmitter is part of a station of a wireless network and the streaming is to the station from the network device coupled to the station by the packetized network link,
  wherein the network device includes a memory wherefrom data is streamed during the wireless transmitting of the wireless network packet, and
  wherein the method further comprises:
    forming a DMA request for said data element and encryption information;
    converting the formed DMA request and the encryption information to a first packet for transport over the network link;
    sending the first packet to the network device over the network link;
    receiving a second packet over the packetized network link from the network device, said second packet containing said data element encrypted according to the encryption information; and
    responding to the formed DMA request with said data element from the second packet,
    such that the streaming of said data element of the data uses the second packet, and such that the encryption occurs at the network device in real time during the streaming.

14. A computer readable storage medium as recited in claim 12, wherein the wireless transmitter is included in a wireless station of a wireless network, wherein the packet is a medium access control (MAC) packet according to a wireless standard, wherein the wireless station is coupled by the packetized network link to the network device, such that the real-time encrypting occurs in the network device outside the wireless station.

15. A computer readable storage medium as recited in claim 12, wherein the wireless transmitter is included in a wireless station of a wireless network, wherein the wireless network packet is a medium access control (MAC) packet according to a wireless standard, wherein the wireless station is coupled by the packetized network link to the network device, wherein the network device includes a memory, wherein the real-time encrypting occurs in the network device outside the wireless station, and wherein the streaming is via direct memory access from the memory.

16. An apparatus to wirelessly receive a wireless network packet, the apparatus including:
  means for wirelessly receiving a wireless network packet, the means for wirelessly receiving coupled to a network device by a packetized network link; and
  means for streaming a data element, including at least some of the contents of the wireless network packet received by the means for wirelessly receiving, the streaming being over the packetized network link during wireless receive time of the wireless network packet by the means for wirelessly receiving,
wherein the data element is streamed by the means for streaming in encrypted form and is decrypted in real time during the streaming, the decrypting after transfer over the packetized network link,
such that the wirelessly receiving of the wireless network packet by the means for wirelessly receiving occurs while at least part of the wireless network packet is being streamed over the packetized network link.

17. A computer-readable storage medium having encoded thereon machine executable instructions that when executed cause carrying out a method of wirelessly receiving a wireless network packet by a wireless receiver coupled to a network device by a packetized network, the method including:
  streaming a data element, including at least some of the contents of the received wireless network packet, over the packetized network link to the network device, the streaming of the data element during wireless receive time of wirelessly receiving the wireless network packet,
wherein the data element is streamed in encrypted form and is decrypted in real time during the streaming, the decrypting after transfer over the packetized network link,
such that the wirelessly receiving of the wireless network packet occurs while at least part of the wireless network packet is being streamed over the packetized network link.

18. A computer readable storage medium as recited in claim 17,
  wherein the wirelessly receiving is by a station of a wireless network the station including the wireless transmitter and the streaming is from the station to the network device coupled to the station by the packetized network link,
  wherein the network device includes a memory whereto data is streamed during the wirelessly receiving of the wireless network packet, and
  wherein the method further comprises:
    forming a DMA request for writing said data element and encryption information;
    converting the formed DMA request and the encryption information to a first packet for transport over the network link;
    sending the first packet to the network device over the packetized network link;
    encapsulating said data element encrypted according to the encryption information into a second packet for transport over the network link to the network device; and
    sending the second packet over the packetized network link to the network device for writing into the memory of the network device according to the formed DMA request,
    such that the streaming of said data element uses the second packet.

19. A computer readable storage medium as recited in claim 17, wherein the wireless receiving is by a wireless station of a wireless network, the wireless station including the wireless receiver, wherein the wireless network packet is a medium access control (MAC) packet according to a wireless standard, wherein the wireless station is coupled by the packetized network link to the network device, such that the real-time decrypting occurs in the network device outside the wireless station.

20. A computer readable storage medium as recited in claim 17 wherein the wireless receiving is by a wireless station of a wireless network, the wireless station including the wireless receiver, wherein the wireless network packet is a medium access control (MAC) packet according to a wireless standard, wherein the wireless station is coupled by the packetized network link to the network device, wherein the network device includes a memory, wherein the real-time decrypting occurs in the network device outside the wireless station, and wherein the streaming is via direct memory access to the memory.

* * * * *